United States Patent
Su (10) Patent No.: US 9,752,437 B2
(45) Date of Patent: Sep. 5, 2017

(54) CHILD-MOTHER TYPE DOUBLE-WHEEL ROTOR STEAM POWER MACHINE

(71) Applicant: Yongkuai Su, Nanning (CN)

(72) Inventor: Yongkuai Su, Nanning (CN)

(*) Notice: Subject to any disclaimer, the term of this patent is extended or adjusted under 35 U.S.C. 154(b) by 103 days.

(21) Appl. No.: 14/766,058

(22) PCT Filed: Jan. 26, 2014

(86) PCT No.: PCT/CN2014/000103
§ 371 (c)(1),
(2) Date: Aug. 5, 2015

(87) PCT Pub. No.: WO2014/121655
PCT Pub. Date: Aug. 14, 2014

(65) Prior Publication Data
US 2015/0361795 A1 Dec. 17, 2015

(30) Foreign Application Priority Data
Feb. 7, 2013 (CN) .......................... 2013 1 0050282

(51) Int. Cl.
*F01D 1/02* (2006.01)
*F01D 9/02* (2006.01)

(52) U.S. Cl.
CPC .............. *F01D 1/02* (2013.01); *F01D 9/023* (2013.01); *F05D 2220/31* (2013.01); *Y02T 50/671* (2013.01)

(58) Field of Classification Search
CPC .......... F01D 1/02; F01D 9/023; Y02T 50/671; F05D 2220/31
(Continued)

(56) References Cited

U.S. PATENT DOCUMENTS 4,205,380 A * 5/1980 Braytenbah ............. F01K 13/02
290/40 R 4,461,152 A * 7/1984 Tennichi .................. F01D 17/24
60/660
(Continued)

FOREIGN PATENT DOCUMENTS

CN 2702088 Y 5/2005
CN 1766310 A 5/2006
(Continued)

OTHER PUBLICATIONS

International Search Report and Written Opinion for related International Application No. PCT/CN2014/000103; report dated Apr. 14, 2014.
(Continued)

Primary Examiner — Hoang Nguyen
(74) Attorney, Agent, or Firm — Miller, Matthias & Hull LLP (57) ABSTRACT

A child-mother type double-wheel rotor steam powered machine is disclosed, including a child-wheel rotor and a mother-wheel rotor arranged within the case body and mounted on a same rotation shaft, wherein a hole-slot and a hole-slot facing a same direction are arranged on the peripheral of the child-wheel rotor and the peripheral of the mother-wheel rotor; one end of the rotation shaft is fitted with an inertial flywheel and a power output wheel, and the other end is fitted with a cam control output wheel; an exhaust pipe is provided on the bottom of the case body; a spray head is provided on the top of the case body, and inlets of the child-wheel air boring and the mother-wheel air boring of the spray head are connected to a high pressure steam inlet pipe respectively; a valve switch is arranged above the mother-wheel nozzle; the cam control output wheel is connected to a transmission device with a cam, and the cam is capable of controlling the action of the valve switch. The child-mother type double-wheel rotor steam powered machine of the present invention uses environment-friendly and renewable clean energy source, especially high pressure steam, to propel a machine for doing work, which can save energy, and is beneficial for popularization and utilization due to its simple configuration.

10 Claims, 6 Drawing Sheets (58) Field of Classification Search
USPC .......................... 60/646, 657, 660–664, 666
See application file for complete search history.

(56) References Cited

U.S. PATENT DOCUMENTS

| | | | | |
|---|---|---|---|---|
| 4,499,756 | A | * | 2/1985 | Medeiros ................ F01D 21/20 60/660 |
| 4,635,209 | A | * | 1/1987 | Hwang ................... F01D 21/02 60/646 |
| 4,688,385 | A | * | 8/1987 | Shibashita ............. F01D 19/02 60/646 |
| 5,743,094 | A | * | 4/1998 | Zimron .................... F01D 5/02 415/176 |

FOREIGN PATENT DOCUMENTS

| | | |
|---|---|---|
| CN | 201078245 Y | 6/2008 |
| CN | 101440720 A | 5/2009 |
| CN | 102128053 A | 7/2011 |
| CN | 102278144 A | 12/2011 |
| CN | 103114874 A | 5/2013 |
| EP | 1690010 A1 | 8/2006 |
| JP | H1047002 Y | 2/1998 |
| JP | 2004156470 A | 6/2004 |
| JP | 2008111539 A | 5/2008 |
| KR | 20100131847 A | 12/2010 |

OTHER PUBLICATIONS

First Office Action for related Priority Chinese Application No. 201310050282.1 mailed on Jul. 12, 2014.
Second Office Action for related Priority Chinese Application No. 201310050282.1 mailed on Nov. 17, 2014.

* cited by examiner

CHILD-MOTHER TYPE DOUBLE-WHEEL ROTOR STEAM POWER MACHINE

CROSS-REFERENCE TO RELATED APPLICATION

This application is a 35 USC §371 U.S. national stage filing of International Patent Application. No. PCT/CN2014/000103 filed on Jan. 26, 2014, and claiming priority under the Paris Convention to Chinese Patent Application No. CN 201310050282.1 filed on Feb. 7, 2013.

FIELD

The present invention relates to a steam powered machine, which is a power machine that converts electrical energy, solar energy, nuclear energy and other energy sources into mechanical energy, such as kinetic energy, as steam through a medium, and particularly to a child-mother type double-wheel rotor steam powered machine which use a high pressure steam to propel a machine for doing work.

BACKGROUND

At present, the power machines used in the world are mostly external combustion engines, internal combustion engines and electric motors. The external combustion engine mainly refers to steam engine which, as a symbol of the industrial revolution in the eighteenth-century, has promoted the advancement of the modern industrial society. However, the steam engine has some disadvantages. It cannot be separated from the boiler which makes the whole device very large and bulky. The pressure and temperature of new steam cannot be too high, and the discharge pressure cannot be too low, so the thermal efficiency can hardly be increased. It is a reciprocating machine that the inertial force limits the speed of rotation. In addition, its working process is discontinuous, and the flow of the steam is limited, which in turn limits the increase of the power.

In a general sense, the internal combustion engine includes not only a reciprocating piston internal combustion engine, a rotary vane gas turbine and a free piston engine, but also a rotary vane gas turbine and a jet engine. Usually, an internal combustion engine refers to a piston internal combustion engine.

The internal combustion engine, which has abandoned the bulky boiler, has gradually replaced the steam engine in the ship or in the locomotive, due to its advantages of light weight, small size, high thermal efficiency and flexible operation.

Since its introduction in the 1860s, the piston internal combustion engine has become a comparative perfect machine after the unceasing improvement and the development. The piston internal combustion engine has been widely used for its features of high thermal efficiency, wide power and range of rotation speed, convenient supporting and good mobility. Around the world, various types of machines, such as automobile, tractor, farm machine, engineering machine, small mobile power station and chariot, are powered by an internal combustion engine. Merchant ships on a sea or on a river, conventional warships and some small planes are also propelled by the internal combustion engine. The amount of the internal combustion engines is above all other power machines in the world, and the internal combustion engine plays a very important role in human activities.

Compared with the piston internal combustion engine and the steam powered device, the main advantages of the gas turbine are small and light. The weight per unit power of the heavy-duty gas turbine is generally 2-5 kilograms per kilowatt, and the weight per unit power of the airplane is below 0.2 kilogram per kilowatt. The gas turbine occupies a small area, and when it is used in a transport machine, such as a vehicle or ship, it can save space, or a gas turbine of larger power can be provided to improve the speed of the vehicle or ship. The main disadvantage of the gas turbine is its low efficiency that its efficiency decreases quickly under part-load condition and the fuel consumption is high under non-load condition.

Then the electric motor, with its convenience, replaces the steam engine in the industry equipment.

The piston internal combustion engine has the advantages of high heating efficiency, small size and large application range. The gas turbine has the advantages of small size, light weight and high single-machine power, which can save space; a gas turbine of larger power can be equipped to improve the speed of the vehicle or ship. However, the oil energy consumed by the internal combustion engine is non-renewable energy. After more than a hundred years' development and industrialized application, the oil energy is becoming drained, and the energy crisis is closely approaching. To leave our future generations remaining valuable resources, energy saving, emission reduction, searching and developing a reproducible energy are becoming important and urgent for us.

Carbon dioxide and other waste gases generated and discharged by the internal combustion engine are major contributors to global greenhouse effect, which make global environmental issues become more and more serious. Therefore, both of energy security and environmental issue become obstacles for the further development of the internal combustion engine.

The electric motor is now an ideal power machine in the energy field and in environmental protection, which has a small size and wide range of application. However, compared with the internal combustion engine, the electric motor has outstanding problems of low power and small torque, and in the case of high power, the electric motor has problems of high calorific value and high power consumption. These problems thus limit the development and application of the electric motor in many fields.

The subject and objective of the present invention are to study and invent a power machine which use clean energy sources and is energy-efficient.

SUMMARY

The technical solution to be solved by the present invention is to provide a child-mother type double-wheel rotor steam powered machine, which uses environment-friendly and renewable clean energy source as its power source, and utilizes high pressure steam as a medium to propel a machine for doing work.

The child-mother type double-wheel rotor steam powered machine of the present invention includes a case body 1; and at least one group of a child-wheel rotor 2 and a mother-wheel rotor 3 arranged within the case body 1 and mounted on a same rotation shaft 19; a hole-slot 4 and a hole-slot 5 facing a same direction are arranged on the peripheral of the child-wheel rotor 2 and the peripheral of the mother-wheel rotor 3 respectively, the thickness of the child-wheel rotor 2 is less than that of the mother-wheel rotor 3, the size of the hole-slot 4 is also less than that of the hole-slot 5, both sides of the hole-slot of the child-wheel rotor 2 are provided with sealing rings 84 respectively, both sides of the hole-slot of the mother-wheel rotor 3 are provided with sealing rings 20 respectively, the sealing rings 84 and the sealing rings 20 are configured to be fixed in slots of the case body respectively, and a child-wheel nozzle sealing member 28 is provided between the sealing rings 84, and a mother-wheel nozzle sealing member 29 is provided between the sealing rings 20; wherein the rotation shaft 19 is mounted on the base body through a bearing 6, both ends of the rotation shaft 19 extend out of the case body, with one end fitted with an inertial flywheel 8 and a power output wheel 9, and the other end fitted with a cam control output wheel 10; wherein an exhaust pipe 16 is provided at the bottom of the case body, a spray head 7 is provided on the top of the case body, and the spray head 7 consisted of a child-wheel air boring 23, a child-wheel nozzle 21 connected to the child-wheel air boring 23, a mother-wheel air boring 24, and a mother-wheel nozzle 22 connected to the mother-wheel air boring 24; outlets of the child-wheel nozzle 21 and the mother-wheel nozzle 22 extend into the case boy and in communication with the hole-slots of the child-wheel rotor 2 and the mother-wheel rotor 3 respectively, and inlets of the child-wheel air boring 23 and the mother-wheel air boring 24 are connected to a pressure regulating valve of a high pressure steam inlet pipe through a steam supply pipe respectively; a valve switch 26 is arranged above the mother-wheel nozzle 22, one end of the valve switch 26 is connected to a spring 27, and the other end of the valve switch 26 is connected to a tappet 37, both of the spring 27 and the tappet 37 are mounted within the case of the spray head 7; the cam control output wheel 10 is connected to a cam control transmission device 13 through a chain 12, and a cam 25 that is capable of propelling the tappet 37 is mounted on the cam control transmission device 13.

In the child-mother type double-wheel rotor steam powered machine of the present invention, exhaust blocking members 38 are provided at the bottom of the case body close to the child-wheel rotor 2 and the mother-wheel rotor 3 respectively, and between the sealing rings 84 and the sealing rings 20 respectively, the child-wheel rotor 2, the case body and the sealing ring form an exhaust region 88, the mother-wheel rotor 3, the case body and the sealing ring form a further exhaust region 88, and the exhaust region 88 is communicated with the exhaust pipe 16.

In the child-mother type double-wheel rotor steam powered machine of the present invention, the child-wheel nozzle 21 is provided with two steam outlets, and the two steam outlets are communicated with a same hole-slot of the child-wheel rotor 2. Alternatively, the two steam outlets are communicated with both the two hole-slots of the child-wheel rotor 2.

In the child-mother type double-wheel rotor steam powered machine of the present invention, the number of the child-wheel nozzles 21 is the same as that of the child-wheel rotors 2, the number of the mother-wheel nozzles 22 is the same as that of the mother-wheel rotors 3, and the child-wheel nozzles 21 and the mother-wheel nozzles 22 are obliquely mounted.

The child-wheel nozzle 21 is provided with a sealing member 28, the mother-wheel nozzle 22 is provided with a mother-wheel nozzle 29; and both sides of the sealing member 28 or the mother-wheel nozzle 29 are provided with sealing attachments 89.

In the child-mother type double-wheel rotor steam powered machine of the present invention, there is a plurality of hole-slots on the child-wheel rotor 2, and there is only one hole-slot on the mother-wheel rotor 3, the aperture of which is larger than that of each hole-slot of the child-wheel rotor.

In the child-mother type double-wheel rotor steam powered machine of the present invention, there is more than one group of the child-wheel rotor and the mother-wheel rotor, the same rotation shaft 19 is adapted to be added with a plurality of child-wheel rotors and mother-wheel rotors, and the diameters of the child-wheel rotor and mother-wheel rotor can be the same or different.

In the child-mother type double-wheel rotor steam powered machine of the present invention, the calibers of the hole-slots of the child-wheel rotor are the same, and the hole-slots are far away from the centre of the rotor as much as possible, arranged from shallow to deep, and each of the hole-slots are not communicated with other hole-slots.

For the child-wheel rotor 2 and the mother-wheel rotor 3, a valve switch 26 is provided above the mother-wheel nozzle 22 close to the mother-wheel rotor 3, the valve switch 26 is configured to control the mother-wheel rotor 3 to do work, and when the valve switch 26 is turned on, the mother-wheel rotor 3 is pressured to rotate for doing work; and the child-wheel rotor 2 continuously rotates under the action of the high pressure steam sprayed from the child-wheel nozzle 21 without a valve switch.

In the child-mother type double-wheel rotor steam powered machine of the present invention, both of the two nozzles of the spray head 7 pass through a support bracket 86 which is connected to the case body 1 via an adjusting bolt 46; an adjusting bracket 85 is fixed above the support bracket 86, which is connected to the child-wheel nozzle 21 and the mother-wheel nozzle 22 via adjusting bolts respectively; spray head mounting ports 87 for mounting the sealing members of the child-wheel nozzle 21 and the mother-wheel nozzle 22 respectively are fixed below the support bracket 86, and the spray head mounting ports 87 extend into the case body and are mounted with the sealing member 28 and the sealing member 29 respectively around the child-wheel nozzle 21 and the mother-wheel nozzle 22, and the sealing attachments 89 on both sides of each sealing member; the sealing member 28, the sealing attachment 29 and the sealing attachment 89 are fixed on the spray head mounting ports 87 via a spring screw respectively, and fitted into the sealing rings of the child-wheel rotor 2 and the mother-wheel rotor 3 and attached on arc surfaces of the child-wheel rotor 2 and the mother-wheel rotor 3; and a lubricating oil device 36 is provided between the sealing attachments 89 and the support bracket 86.

In the child-mother type double-wheel rotor steam powered machine of the present invention, a steam supply device connected to the high pressure steam inlet pipe can be a circulating steam supply device or a non-circulating steam supply device.

In the child-mother type double-wheel rotor steam powered machine of the present invention, the cam control transmission device 13 includes a rack and a transmission shaft mounted on the rack. A cam 25 capable of propelling the tappet 37 is mounted on the transmission shaft, and the cam control output wheel 10 is connected to a cam control wheel 11 through a chain 12.

The child-mother type double-wheel rotor steam powered machine of the present invention is small in size, and can increase the radius of the rotor to increase torque, steam pressure and rotation speed. The child-mother type double-wheel rotor steam powered machine of the present invention begins with the starting and propelling of the child-wheel rotor, then the mother-wheel rotor does work, to complete one cycle. During this cycle, the starting and propelling of the child-wheel rotor and the action of the inertial flywheel multiply the work efficiency of the mother-wheel rotor.

The child-mother type double-wheel rotor steam powered machine of the present invention uses environment-friendly and renewable clean energy source, especially high pressure steam, to propel a machine for doing work. It can save energy, and is beneficial for popularization and utilization due to its simple configuration.

BRIEF DESCRIPTION OF THE DRAWINGS

FIG. 2-1 is a schematic diagram illustrating a cross section of the child-wheel rotor after the child-wheel rotor starting to propel, when the two steam outlets of the child-wheel rotor are communicated with the first hole-slot.

FIG. 2-2 is a schematic diagram illustrating a cross section of the child-wheel rotor after the child-wheel rotor has rotated for a certain angle, when the front steam outlet end of the child-wheel rotor is communicated with the first hole-slot, whilst the rear steam outlet end of the child-wheel rotor is not communicated with the first hole-slot.

FIG. 2-3 is a schematic diagram illustrating a cross section of the child-wheel rotor when the child-wheel rotor is starting and propelling, in which the front steam outlet end of the child-wheel rotor is communicated with the first hole-slot, whilst the rear steam outlet end of the child-wheel rotor is communicated with the second hole-slot.

FIG. 2-4 is a schematic diagram illustrating a cross section of the child-wheel rotor when the child-wheel rotor has rotated a circle and returned to its starting location, in which the state of the child-wheel rotor is the same as that of the child-wheel rotor in FIG. 2-1.

FIG. 9-1 is a block diagram illustrating a non-circulating steam supply device used in the present invention according to a first solution.

FIG. 9-2 is a block diagram illustrating a non-circulating steam supply device used in the present invention according to a second solution.

FIG. 9-3 is a block diagram illustrating a non-circulating steam supply device used in the present invention according to a third solution.

DETAILED DESCRIPTION OF THE PREFERRED EMBODIMENTS

The present invention will be further described by reference to the accompanying drawings.

Figure 1:
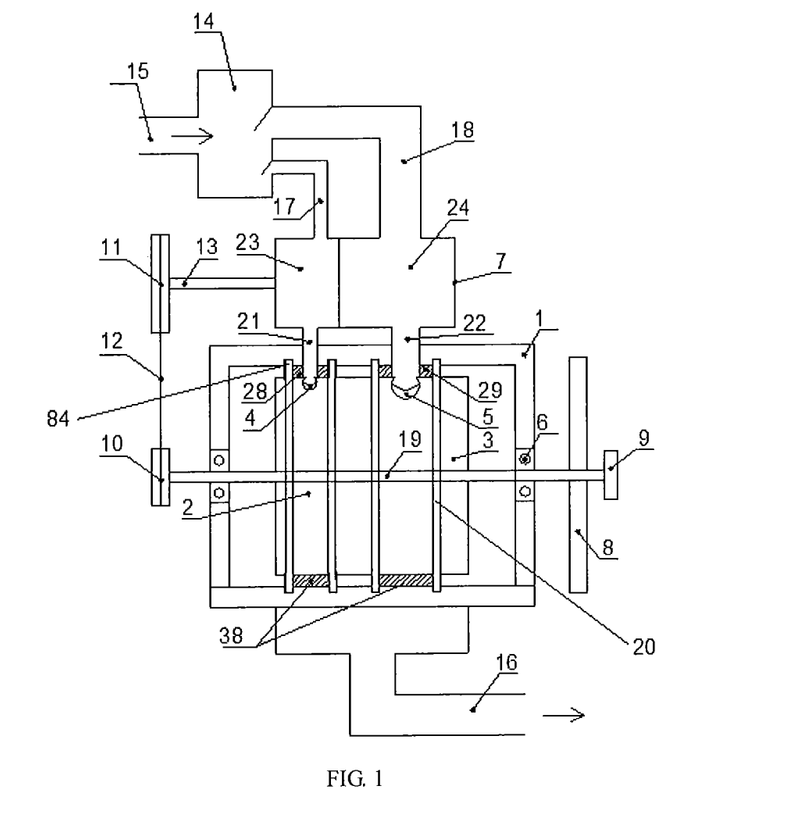
FIG. 1 is a schematic diagram illustrating a child-mother type double-wheel rotor steam powered machine according to the present invention.

As show in FIG. 1, the child-mother type double-wheel rotor steam powered machine of the present invention has a group of a child-wheel rotor 2 and a mother-wheel rotor 3 arranged within a case body 1 and mounted on a same rotation shaft 19, wherein a hole-slot 4 and a hole-slot 5 facing a same direction are arranged on the peripheral of the child-wheel rotor 2 and the peripheral of the mother-wheel rotor 3 respectively. There is a plurality of hole-slots 4 on the child-wheel rotor 2, and only one hole-slot 5 on the mother-wheel rotor 3. The thickness of the child-wheel rotor 2 is less than that of the mother-wheel rotor 3, and the size of the opening of the hole-slot 4 is also less than that of the hole-slot 5. Both sides of the hole-slot of the child-wheel rotor 2 are provided with sealing rings 84 configured to be fixed in slots of the case body, and a child-wheel nozzle sealing member 28 is provided between the sealing rings 84. Both sides of the hole-slot of the mother-wheel rotor 3 are provided with sealing rings 20 configured to be fixed in slots of the case body, and a mother-wheel nozzle sealing member 29 is provided between the sealing rings 20. The rotation shaft 19 is mounted on the base body 1 through two bearings 6, both ends of the rotation shaft 19 extending out of the case body, with one end fitted with an inertial flywheel 8 and a power output wheel 9, and the other end fitted with a cam control output wheel 10. Exhaust blocking members 38 are provided on the bottom of the case body 1 close to the child-wheel rotor 2 and the mother-wheel rotor 3 respectively, and the exhaust blocking members 38 are arranged between the sealing rings 84 and the sealing rings 20 respectively. The two exhaust blocking members 38 are fixed on the case body 1 via a spring screw 49, the child-wheel rotor 2, the case body 1 and the sealing ring 84 form an exhaust region 88, the mother-wheel rotor 3, the case body 1 and the sealing ring 20 form a further exhaust region 88, and the exhaust region 88 is communicated with the exhaust pipe 16. An exhaust pipe 16 is provided on the bottom of the case body, and a spray head 7 is provided on the top of the case body. The spray head 7 is consisted of a child-wheel air boring 23, a child-wheel nozzle 21 connected to the child-wheel air boring 23, a mother-wheel air boring 24, and a mother-wheel nozzle 22 connected to the mother-wheel air boring 24. The child-wheel nozzle 21 extends into the case boy 1 and is in communication with the hole-slots 4 of the child-wheel rotor 2, and the outlet end of the mother-wheel nozzle 22 extends into the case boy 1 and is in communication with the hole-slot 5 of the mother-wheel rotor 3. The inlet end of the child-wheel air boring 23 is connected to a child-wheel steam supply pipe 17, the inlet end of the mother-wheel air boring 24 is connected to a mother-wheel steam supply pipe 18, and the child-wheel steam supply pipe 17 and the mother-wheel steam supply pipe 18 are connected to a pressure regulating valve 14 of a high pressure steam inlet pipe 15. A valve switch 26 is arranged above the mother-wheel nozzle 22, one end of the valve switch 26 is connected to a spring 27, and the other end of the valve switch 26 is connected to a tappet 37. Both of the spring 27 and the tappet 37 are mounted in the case body. The cam control output wheel 10 is connected to a cam control transmission device 13 through a chain 12, and a cam 25 that is capable of propelling the tappet 37 is mounted on the cam control transmission device 13.

The cam control transmission device 13 adopted in the present invention includes a rack and a transmission shaft mounted on the rack, the cam 25 is mounted on the transmission shaft, and the cam control output wheel 10 is connected to a cam control wheel 11 through a chain 12.

When working, the high pressure steam enters into the inlet port 15, of which the pressure is adjusted by the pressure regulating valve 14. Then, the pressure-regulated steam enters into the child-wheel air boring 23 and the mother-wheel air boring 24 via the child-wheel steam supply pipe 17 and the mother-wheel steam supply pipe 18 respectively, and comes out of the child-wheel nozzle 21 and the mother-wheel nozzle 22 to apply pressure on the hole-slots 4 of the child-wheel rotor 2 and hole-slot 5 of the mother-wheel rotor 3 for doing work. Firstly, the high pressure steam may be translated into mechanical energy (kinetic energy) by the continuous actions of starting, propelling and doing work of the child-wheel rotor 2, by which the child-wheel rotor may rotate. When the rotation of the child-wheel rotor meets the required revolution number, the cam control output wheel 10 may drive the cam control wheel 11 to rotate. With the transmission of the transmission device 13, the cam 25 may touch the tappet 37 to turn on the valve switch 26, and the high pressure steam sprayed from the mother-wheel nozzle 22 into the hole-slot 5 of the mother-wheel rotor 3 to apply pressure on the mother-wheel rotor 3 to make the mother-wheel rotor 3 rotate. After completing the work, the low pressure steam enters into the exhaust region 88 and exhaust through the exhaust pipe 16, one end of the rotation shaft 19 is provided with the inertial flywheel 8, and the power output wheel 9 outputs the power. When the hole-slot of the child-wheel rotor or the mother-wheel rotor is away from the sealing attachment 89, the high pressure steam may turn into a low pressure steam, and the low pressure steam may enters into the exhaust region 88, and exhaust through the exhaust pipe 16.

There may be one or more groups of the child-wheel rotor 2 and the mother-wheel rotor 3. A plurality of child-wheel rotors and mother-wheel rotors may be added on the same rotation shaft 19, the diameter of the child-wheel rotor may be the same as or different from that of the mother-wheel rotor. There is a plurality of hole-slots on the child-wheel rotor, while there is only one hole-slot on the mother-wheel rotor.

FIGS. 2-1 to 2-4 illustrate the starting, propelling and running processes of the child-wheel rotor 2. The high pressure steam passes through the inlet pipe 15, the pressure regulating valve 14 and the child-wheel steam supply pipe 17, enters into the child-wheel air boring 23, and then is sprayed out of the two outlet ports of the child-wheel nozzle 21 to do work for the first hole-slot 4, and the child-wheel rotor is forced to rotate. When the rear outlet port is close, the front outlet port may continue to do work to the first hole-slot 4, and the child-wheel rotor may continue to be forced to rotate. When the rear outlet port starts to apply pressure on and do work to the second hole-slot, the front outlet port supply the last steam to the first hole-slot and apply the last pressure on the first hole-slot. When the child-wheel rotor continues to rotate until two outlet ports apply pressure on and do work to a same hole-slot, one power exchange is completed, and the work circulates to apply pressure on and do work to the child-wheel rotor. After one cycle until the mother-wheel nozzle does work to the mother-wheel rotor, one complete working cycle of the steam powered machine is completed.

Figure 3:
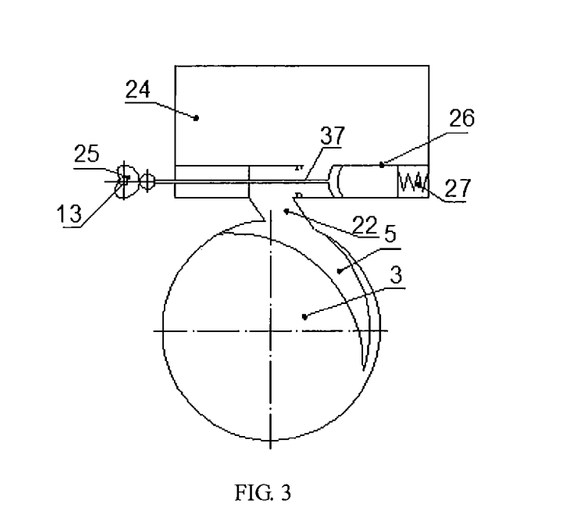
FIG. 3 is a schematic diagram illustrating a cross section of the mother-wheel rotor and the mother-wheel nozzle connected to the mother-wheel rotor for doing work.

FIG. 3 is a schematic diagram illustrating a mother-wheel rotor for doing work. With the activating and propelling of the child-wheel rotor 2, the mother-wheel rotor 3 rotates along with the child-wheel rotor 2. When the hole-slot 5 arrives at the position of the mother-wheel nozzle 22, the cam 25 just touches the tappet 37 to turn on the valve switch 26 connected to the tappet 37, and at this moment, the high pressure steam in the mother-wheel air boring 24 sprayed from the mother-wheel nozzle 22 to apply pressure on and do work to the hole-slot 5, and the mother-wheel rotor 3 is forced to rotate. When the cam 25 rotates to the concave surface, the valve switch 26 is close with the thrust of the spring 27, to complete the switching process of the steam supply.

Figure 4:
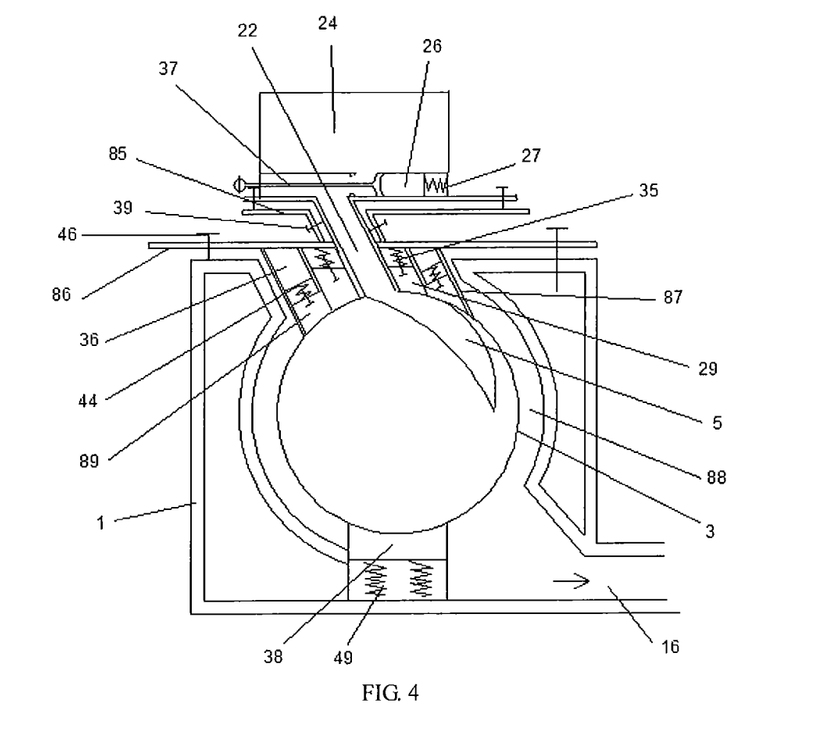
FIG. 4 is a schematic diagram illustrating a cross section of the mother-wheel rotor connected to the mother-wheel nozzle and mounted on the case body.
Figure 7:
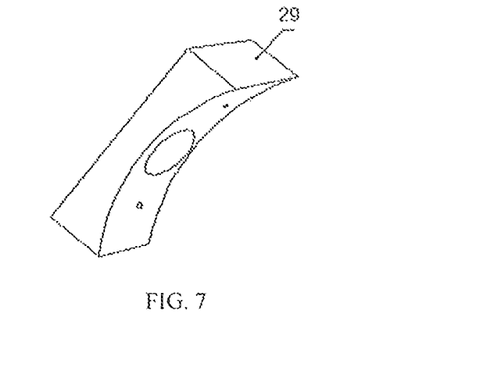
FIG. 7 is a schematic diagram illustrating a sealing member 29 fitted into the mother-wheel nozzle.

FIG. 4 is a schematic diagram illustrating a cross section of the mother-wheel rotor 3 connected to the mother-wheel nozzle 22 and mounted on the case body 1. Both of the child-wheel nozzle 21 and the mother-wheel nozzle 22 of the spray head 7 pass through a support bracket 86 which is connected to the case body 1 via an adjusting bolt 46. An adjusting bracket 85 is fixed above the support bracket 86, the adjusting bracket 85 may adjust the fastening of the mother-wheel nozzle 22 via a adjusting screw 39, and a valve switch 26 is arranged above the mother-wheel nozzle 22. A spray head mounting port 87 for mounting the mother-wheel nozzle sealing member 29 is fixed below the support bracket 86, the spray head mounting port 87 extends into the case body and is mounted with the sealing member 28 around the mother-wheel nozzle 22, and the sealing attachment 89 on both sides of the sealing member 29. The sealing member 29 is fixed on the spray head mounting ports 87 via a spring screw 35, and the sealing attachment 89 is mounted on the spray head mounting port 87 via a spring screw 44. A lubricating oil device 36 is provided between the sealing attachments 89 and the support bracket 86. FIG. 7 illuminates the structure of the mother-wheel nozzle sealing member 29, the middle part of the mother-wheel nozzle sealing member 29 is provided with a through hole passing through the mother-wheel nozzle, and both ends of the mother-wheel nozzle sealing member 29 are provided with holes for installing the spring screws.

Figure 5:
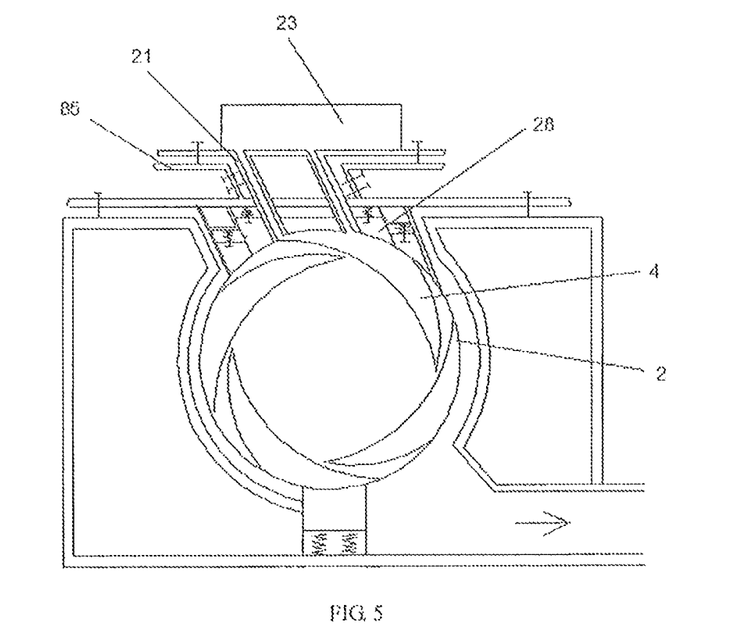
FIG. 5 is a schematic diagram illustrating a cross section of the child-wheel rotor connected to the child-wheel nozzle and mounted on the case body.
Figure 6:
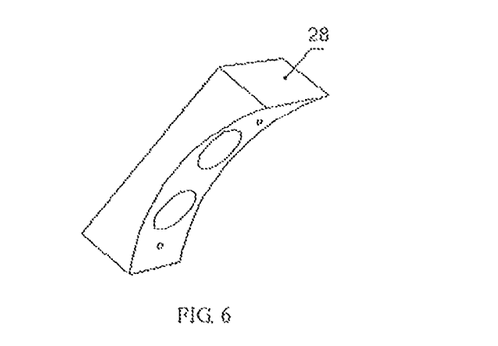
FIG. 6 is a schematic diagram illustrating a sealing member 28 fitted into the child-wheel nozzle.

FIG. 5 is a schematic diagram illustrating a cross section of the child-wheel rotor 2 connected to the child-wheel nozzle 21 and mounted on the case body. The structure shown is basically the same as the structure of the mother-wheel rotor 3 connected to the child-wheel rotor 2 in FIG. 4, the difference is that the child-wheel nozzle 21 does not have a valve switch and the child-wheel nozzle sealing member 28 adopted by it is shown in FIG. 6, in which the middle part of the child-wheel nozzle sealing member 28 is provided with two through holes passing through the child-wheel nozzle.

The child-wheel nozzle 21 and mother-wheel nozzle 22 of the present invention are close to the child-wheel rotor 2 and the mother-wheel rotor 3, and the child-wheel nozzle 21 and the mother-wheel nozzle 22 are obliquely mounted at an angle, so the acting force can be far away from the center of each of the mother-wheel rotor and the child-wheel rotor as much as possible, to provide a arm of force as long as possible, which can save effort and energy.

The installation positions of the spray head 7 and the case body 1 can be adjusted by adjusting the adjusting bolt 46 or the adjusting bolts 39 to adjust the installation position of the support bracket 86 or the adjusting bracket 85, so as to adjust the distance between the spray head and the child-wheel rotor and the mother-wheel rotor according to the need.

Lubricating oil can flow onto the outer surface of the sealing member 28, the sealing member 29, the sealing attachment 89, the child-wheel rotor and the mother-wheel rotor by the lubricating oil device 36.

The child-wheel nozzle and the mother-wheel nozzle are provided in pairs, the number of the child-wheel nozzle is the same as that of the child-wheel rotor, and the number of the mother-wheel nozzle is the same as that of the mother-wheel rotor.

The steam supply device connected to the high pressure steam inlet pipe 15 can be a circulating steam supply device or a non-circulating steam supply device.

Figure 8:
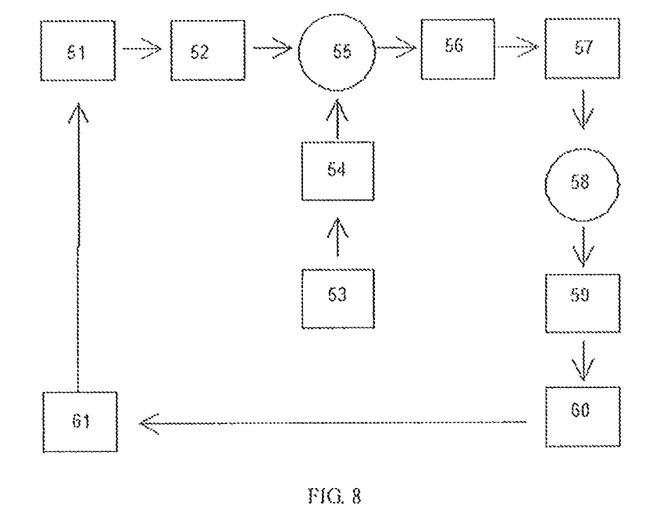
FIG. 8 is a block diagram illustrating a circulating steam supply device used in the present invention.
Figure 21:
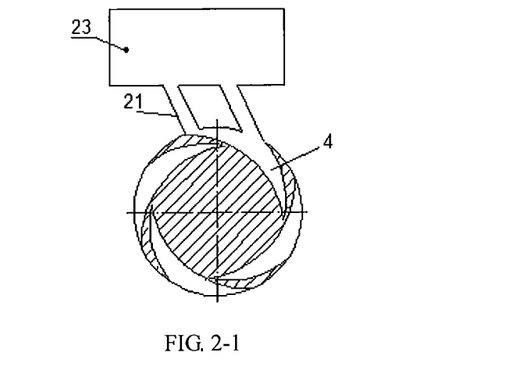
Figure 22:
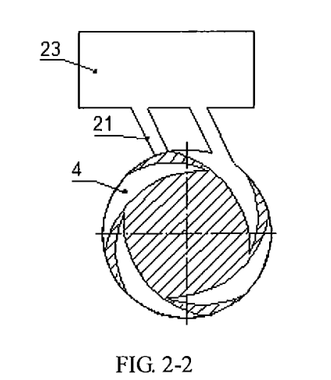
Figure 23:
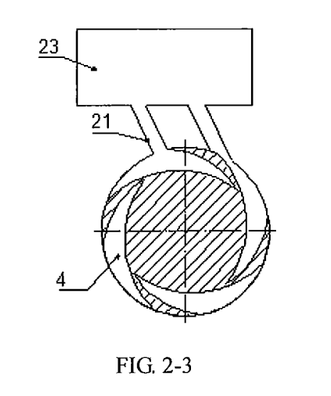
Figure 24:
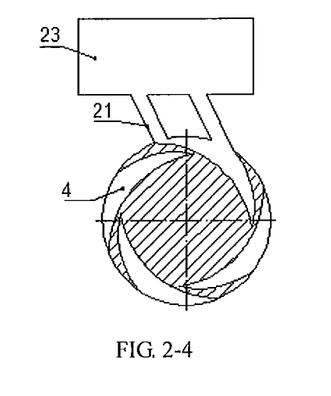

FIG. 8 is a block diagram illustrating a circulating steam supply. In the steam supply of the embodiment, a refrigerant such as R134a is used as a medium. A liquid pump 52 may draw the liquid refrigerant from a liquid reservoir 51 to a metal tube vaporizing device 55 which is powered by a power source 53 and heated by a heating device 54, for example, electromagnetic heating device. The liquid refrigerant is heated and transferred into steam in the metal tube vaporizing device 55, and the steam is pressurized by a pressurizing device 56 and sent to a steam container 57 to back-up. The high pressure steam can be converted into mechanical kinetic energy by the child-mother type double-wheel rotor steam powered machine 58 of the present invention, after that, the low pressure steam exhausts from the exhaust device 59 (steam pump). The steam can be cooled by a radiator 60, be compressed for liquefaction by a compressor 61, and sent back to the liquid reservoir. Only one of the embodiments of the circulating steam supply device is described herein, and other embodiments may use other environment-friendly liquid as the medium, or use other environment-friendly energy to implement the circulating steam supply.

Figure 91:
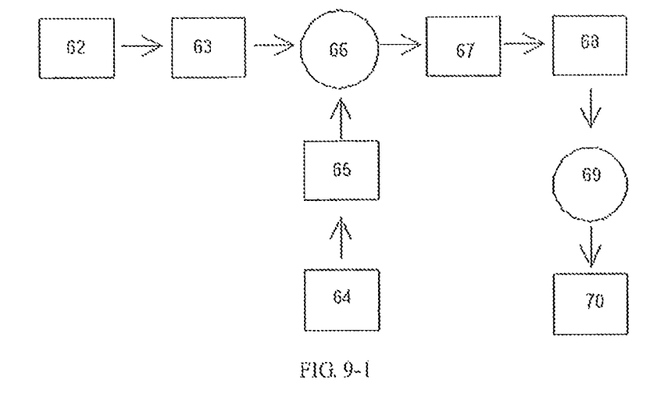
Figure 92:
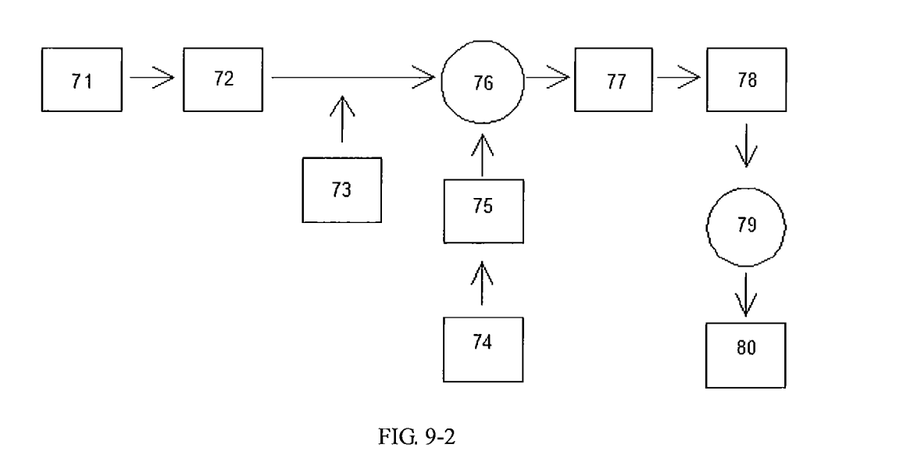
Figure 93:
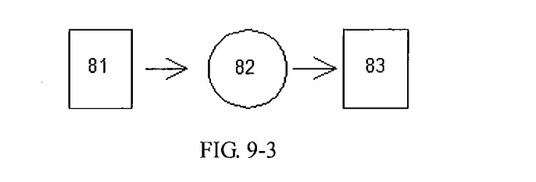

FIGS. 9A-9C are block diagrams illustrating non-circulating steam supply devices used for the child-mother type double-wheel rotor steam powered machine of the present invention.

FIG. 9A is a block diagram illustrating a nonrecurring liquid vaporization for steam supply according to the first solution. A liquid pump 63 may draw the liquid from a liquid reservoir 62 to a metal tube vaporizing device 66 which is powered by a power source 64 and heated by an electromagnetic heating device 65. The liquid is heated and transferred into steam in the metal tube vaporizing device 66, and the steam is pressurized by a pressurizing device 67, and sent to a steam container 68 to back-up. The high pressure steam can be converted into mechanical kinetic energy by the child-mother type double-wheel rotor steam powered machine 69 of the present invention, after that, the low pressure steam exhausts from the exhaust device 70.

FIG. 9B is a block diagram illustrating nonrecurring liquid vaporization for steam supply according to the second solution. In the embodiment, liquid and air are used as the medium. A liquid pump 72 may draw the liquid from a liquid reservoir 71 to a metal tube vaporizing device 76 which is powered by a power source 74 and heated by a heating device 75, in which the atomization of compressed air 73 is added the pipeline. The liquid is heated and transferred into steam in the metal tube vaporizing device 76, and the steam is pressurized by a pressurizing device 77, and sent to a steam container 78 to back-up. The high pressure steam can be converted into mechanical kinetic energy by the child-mother type double-wheel rotor steam powered machine 79 of the present invention, after that, the low pressure steam exhausts from the exhaust device 80.

FIG. 9C is a block diagram illustrating nonrecurring liquid vaporization for steam supply according to the third solution. The solution can apply to various small power machines, such as a simple and convenient compressed air car or compressed air power tool. A high pressure steam container 81 stores the steam and supply the steam to the child-mother type double-wheel rotor steam powered machine 82 of the present invention, the power machine may operate and drive the machine to operate, and the steam exhausts from the exhaust device 83.

The above are preferred embodiments of the invention described in detail, and should not be deemed as limitations to the scope of the present invention. It should be noted that variations and improvements will become apparent to those skilled in the art to which the present invention pertains without departing from its spirit and scope. For example, the starting of the child-wheel rotor 2 can be replaced with an electric motor. Therefore, the scope of the present disclosure is defined by the appended claims.

What is claimed is:

1. A child-mother type double-wheel rotor steam powered machine, comprising a case body; at least one group of a child-wheel rotor and a mother-wheel rotor arranged within the case body and mounted on a same rotation shaft, wherein a hole-slot and a hole-slot facing a same direction are arranged on the peripherals of the child-wheel rotor and the mother-wheel rotor respectively; the thickness of the child-wheel rotor is less than that of the mother-wheel rotor, and the size of the hole-slot is also less than that of the hole-slot; both sides of the hole-slot of the child-wheel rotor are provided with sealing rings respectively, both sides of the hole-slot of the mother-wheel rotor are provided with sealing rings respectively, and the sealing rings and the sealing rings are configured to be fixed in slots of the case body respectively; a child-wheel nozzle sealing member is provided between the sealing rings, and a mother-wheel nozzle sealing member is provided between the sealing rings; wherein the rotation shaft is mounted on the base body via a bearing, and both ends of the rotation shaft extend out of the case body, with one end fitted with an inertial flywheel and a power output wheel, and the other end fitted with a cam control output wheel; wherein an exhaust pipe is provided on the bottom of the case body, a spray head is provided on the top of the case body, the spray head being consisted of a child-wheel air boring, a child-wheel nozzle connected to the child-wheel air boring, a mother-wheel air boring, and a mother-wheel nozzle connected to the mother-wheel air boring; outlets of the child-wheel nozzle and the mother-wheel nozzle extend into the case boy and is in communication with the hole-slots of the child-wheel rotor and the mother-wheel rotor respectively, inlets of the child-wheel air boring and the mother-wheel air boring are connected to a pressure regulating valve of a high pressure steam inlet pipe through a steam supply pipe respectively; a valve switch is arranged above the mother-wheel nozzle, one end of the valve switch is connected to a spring, and the other end of the valve switch is connected to a tappet; both of the spring and the tappet are mounted within a case body of the spray head; the cam control output wheel is connected to a cam control transmission device through a chain, and a cam that is capable of propelling the tappet is mounted on the cam control transmission device.

2. The child-mother type double-wheel rotor steam powered machine of claim 1, wherein exhaust blocking members are provided at the bottom of the case body close to the child-wheel rotor and the mother-wheel rotor respectively, and the exhaust blocking members are arranged between the sealing rings and the sealing rings respectively; the child-wheel rotor, the mother-wheel rotor and the case body and the sealing ring form respectively an exhaust region, and the exhaust region is communicated with the exhaust pipe.

3. The child-mother type double-wheel rotor steam powered machine of claim 1, wherein the child-wheel nozzle is provided with two steam outlets, which are communicated with a same hole-slot of the child-wheel rotor, or are communicated with both the two hole-slots of the child-wheel rotor; the child-wheel nozzle is provided with a sealing member, the mother-wheel nozzle is provided with a mother-wheel nozzle, and the child-wheel nozzle and the mother-wheel nozzle are obliquely mounted.

4. The child-mother type double-wheel rotor steam powered machine of claim 1, wherein the child-wheel rotor and the mother-wheel rotor are configured in a way that a valve switch configured to control the mother-wheel rotor to do work is provided above the mother-wheel nozzle close to the mother-wheel rotor; the mother-wheel rotor is pressured to rotate for doing work when the valve switch is turned on; and the child-wheel rotor continuously rotates for doing work under the action of the high pressure steam sprayed from the child-wheel nozzle without a valve switch.

5. The child-mother type double-wheel rotor steam powered machine of claim 1, wherein the child-wheel rotor and the mother-wheel rotor are configured in a way that the rotation shaft is adapted to be added with a plurality of child-wheel rotors and mother-wheel rotors, and the diameters of the child-wheel rotor and the mother-wheel rotor are the same or different.

6. The child-mother type double-wheel rotor steam powered machine of claim 1, wherein there is a plurality of hole-slots on the child-wheel rotor, and there is only one hole-slot on the mother-wheel rotor, the aperture of the hole-slot being larger than that of each hole-slot of the child-wheel rotor.

7. The child-mother type double-wheel rotor steam powered machine of claim 1, wherein the calibers of the hole-slots of the child-wheel rotor are the same; the hole-slots are located far away from the centre of the rotor as much as possible, and have different depths from shallow to deep; each of the hole-slots is not communicated with the other hole-slots; only one hole-slot is arranged in each mother-wheel rotor, the hole-slots have different depths from shallow to deep and are located far away from the centre of the rotor as much as possible.

8. The child-mother type double-wheel rotor steam powered machine of claim 1, wherein both of the child-wheel nozzle and the mother-wheel nozzle of the spray head pass through a support bracket which is connected to the case body via an adjusting bolt; an adjusting bracket is fixed above the support bracket, which is connected to the child-wheel nozzle and the mother-wheel nozzle via adjusting bolts respectively; spray head mounting ports respectively for mounting the child-wheel nozzle sealing member and the mother-wheel nozzle sealing member are fixed below the support bracket, and the spray head mounting ports extend into the case body and are mounted with the sealing member and the sealing member respectively around the child-wheel nozzle and the mother-wheel nozzle, and the sealing attachments on both sides of each sealing member; the sealing member, the sealing member and the sealing attachments are fixed on the spray head mounting ports via a spring screw respectively, and fit between the sealing rings of the child-wheel rotor and the mother-wheel rotor and are attached on arc surfaces of the child-wheel rotor and the mother-wheel rotor; a lubricating oil device is provided between the sealing attachments and the support bracket.

9. The child-mother type double-wheel rotor steam powered machine of claim 1, wherein a steam supply device connected to the high pressure steam inlet pipe is a circulating steam supply device or a non-circulating steam supply device.

10. The child-mother type double-wheel rotor steam powered machine of claim 1, wherein the cam control transmission device includes a rack and a transmission shaft mounted on the rack, the cam that is capable of propelling the tappet is mounted on the transmission shaft, and the cam control output wheel is connected to a cam control wheel trough a chain.

\* \* \* \* \*